(12) United States Patent
Glanzmann

(10) Patent No.: US 7,299,563 B2
(45) Date of Patent: Nov. 27, 2007

(54) DEVICE FOR POSITIONING MEASURING INSTRUMENTS

(75) Inventor: Kurt Glanzmann, Pfaeffikon / SZ (CH)

(73) Assignee: Hch. Kuendig & Cie. AG, Rueti (CH)

( * ) Notice: Subject to any disclaimer, the term of this patent is extended or adjusted under 35 U.S.C. 154(b) by 0 days.

(21) Appl. No.: 11/312,148

(22) Filed: Dec. 19, 2005

(65) Prior Publication Data
US 2006/0130351 A1 Jun. 22, 2006

(30) Foreign Application Priority Data
Dec. 21, 2004 (EP) .................................. 04405794

(51) Int. Cl.
*G01B 5/20* (2006.01)
*G01B 7/28* (2006.01)
(52) U.S. Cl. .............................. 33/645; 33/553; 33/533
(58) Field of Classification Search .................. 33/645, 33/553, 533, 549, 832–834, 501.02, 551–555
See application file for complete search history.

(56) References Cited

U.S. PATENT DOCUMENTS 3,762,053 A * 10/1973 Day ........................... 33/1 BB
3,941,358 A * 3/1976 Darling ...................... 33/27.12
6,536,128 B2 * 3/2003 Glanzmann .................. 33/553

* cited by examiner

*Primary Examiner*—Yaritza Guadalupe-McCall
(74) *Attorney, Agent, or Firm*—Townsend and Townsend and Crew, LLP

(57) ABSTRACT

The device 1 for positioning the measuring element of a measuring apparatus comprises a traverse 14 on which the measuring element is arranged. The device further comprises a track 11 on which bearings 12, 13 run, and on which the traverse 14 is held by means of bearings 124, 125. The measuring element of the measuring apparatus can be positioned radially in relation to the track 11 and along the track 11. The traverse 14 comprises multiple components, wherein the components 141, 142 of the traverse 14 are interconnected with one or several bearings 143, or the components 141, 142 of the traverse 14 are held inside each other so as to be telescopically slidable. Radial positioning takes place in that the angle $\alpha 14$ between the components 141, 142 of the traverse 14 is changed or in that in the case of a telescopic traverse 14, which constitutes a chord in the track 11, the length is altered.

16 Claims, 2 Drawing Sheets

DEVICE FOR POSITIONING MEASURING INSTRUMENTS

BACKGROUND OF THE INVENTION

The invention relates to a device for positioning the measuring element of measuring instruments.

Such devices are for example used to determine and monitor the thickness of plastic in the production of these films in relation to the goods to be measured. Plastics are for example extruded in a tubular shape and blown to form a bubble whose circumference corresponds to the width of the film to be produced. This method is known as blown film extrusion. When viewed in the direction of movement of the bubble, just downstream of the extruder, an arcuate or annular track is arranged around the plastic film bubble, as concentrically as possible in relation to the bubble made of plastic film. On this track a traverse is arranged, e.g. on pivoted bolsters, on which traverse the measuring element or the measuring head and as a rule also other components of the measuring apparatus are installed. By moving the pivoted bolsters on the track the measuring head with the measuring element can be positioned and guided along the track at adjustable spacing. In a circular track this means that the measuring element is positioned and guided radially and angularly. In this way it is possible to position the measuring head in a radially correct manner in relation to the goods to be measured, e.g. the film bubble, and to guide the measuring head, e.g. at the correct spacing, around the circumference of the goods to be measured.

The measuring element of the measuring apparatus monitors the thickness of a plastic film only along a width of a few millimeters or centimeters. As a rule, in the direction of movement of the extruded film, i.e. in the production direction, the thickness of plastic film varies only slightly rather than varying suddenly and abruptly. Variations in the thickness of film around the circumference of an extruded film bubble are experienced significantly more frequently than are variations along the film bubble. Thus, predominantly variations in thickness transverse to the direction of movement of the extruded film are experienced, in the so-called transverse profile. In most cases it is thus sufficient to move the measuring head e.g. periodically around the circumference of the film bubble in order to detect faults in the thickness of the bubble. Moving the measuring head to and fro on the annular track around the extruded bubble is referred to as "reversing". However, the measuring head can also circle continuously around the film bubble, on the annular track.

This movement to and fro of the measuring apparatus around the circumference of the bubble or the motion of rotation around the bubble can be achieved in various ways. For example a trolley can be arranged on the rail-like track, with the measuring unit being attached to the trolley. The trolley can be self-propelled or driven in some other way, e.g. using a continuous rope or pulley. Flexible cables or sliding contacts such as slip rings can be provided for transmitting the measuring signals, control signals and/or the supply of power to the measuring unit and the drive. Measuring signals and control signals can also be transmitted wirelessly. EP 1 116 931 A1 describes a device for positioning measuring elements, in which device a rigid traverse is slidably held by two pivoted bolsters, which are for example driven, and is carried by the pivoted bolsters. The pivoted bolsters run on a rail track, which is for example circular, and can move on this track towards each other, away from each other or in unison with each other. In the case of identical movement of the two pivoted bolsters the traverse and in particular the measuring element move in a circular track on the traverse. By sliding the pivoted bolsters towards each other or away from each other the radius of the circular track on which the traverse and the measuring element move is changed.

For example in a circular rail track the length of the traverse is determined by the radial region in which the measuring element is to be positioned. This means that in the case of positions of the measuring element involving large radii, i.e. near the rail track, the ends of the traverse protrude beyond the rail track. This requires further space for the positioning device. In many cases this additionally required space simply does not exist.

It is also possible to do without the traverse. In such a solution a radially aligned telescopic rod is installed on a trolley. The measuring element is arranged on the telescopic rod and is radially slidable and positionable with the telescopic rod. Such a solution is not very stable at a large adjustment range of 1 m to 3 m. There is the danger of undesirable oscillation occurring. In the case of long lengths of the telescopic rod, the torque exerted by the telescopic rod on the trolley becomes very significant. Such deficiencies can only be remedied with very considerable construction expenditure, which for economic reasons is usually not justifiable.

SUMMARY OF THE INVENTION

The present invention provides an improved device for positioning one or several measuring elements, which device, while providing the same or similarly versatile options of positioning the measuring elements, requires less in the way of area and space.

According to the invention the device for positioning measuring instruments has a traverse which includes multiple components that are interconnected with one or more bearings, or the components of the traverse are held inside each other so as to be telescopically slidable. Any reference in the claims to "multipart traverses" refers to and designates the actual girder of the traverse. For example, the term "multipart traverse" does not refer to a carrier girder which forms the traverse, made of one piece, and to connection components such as bearings between the traverse and the pivoted bolster. Components that are affixed to the traverse, such as for example the platform, components of the drive, cables, etc., do not form part of the traverse or of the girder according to this definition.

The new device for positioning measuring instruments comprises a traverse which is supported by bearings that move on a track. In the region of its two ends the traverse is supported by these bearings, for example pivoted bolsters, and is connected to a pivot bearing. Between these pivot bearings, advantageously e.g. in its middle, the traverse comprises a pivot bearing or bending bearing. The traverse is thus not rigid, unlike known traverses, but is an articulated traverse. In the region of the articulation of the traverse a platform can be provided which carries the measuring element and any other components of one or several measuring devices. For example, a device for measuring the distance between the goods to be measured, e.g. a plastic film, and a device for measuring the thickness of the goods to be measured, i.e. the plastic film, can be provided. The connection of the platform to the traverse is constructed such that the measuring elements arranged thereon are always aligned radially or in some other desired direction on both sides of the bearing, for example irrespective of the angle between the components of the traverse. It is also possible to adjust the alignment of the platform by means of a drive.

Instead of a pivot joint it is also possible for a bending bearing, i.e. for example a leaf made of spring steel, to provide an articulated connection between the two components of the traverse. Alternatively the traverse could be made from a leaf of spring steel, which leaf comprises a mounting on both ends, wherein the mounting at the two ends is connected to one of the pivoted bolsters by way of a pivot bearing each. In this case the bending bearing itself would constitute the majority of the traverse between the two pivot bearings.

The two components that are connected by the bearing can preferably together form an obtuse angle, an angle of 180° or a concave angle. However it is not at all impossible for the two components to be in a position at a right angle or an acute angle. Thus, by an increase in the spacing between the two pivoted bolsters and a subsequent decrease in the spacing, the traverse according to the invention can cover a large radial region for positioning.

The bearings by which the region of the ends of the traverse is connected to the trolleys or pivoted bolsters and is held thereon, just like the bearing between the components of the traverse, need to be constructed to have as little play as possible so as to ensure precise positioning. In order to keep the forces and moments which the traverse exerts on the bearings to a minimum, the traverse can be a lightweight structure; e.g. it can be a fiber-reinforced honeycomb structure or a composite structure. A foamed composite structure would also be suitable.

The pivoted bolsters on which the traverse is pivotably held are guided on the rails of the track and are also secured against being lifted off the rails. For example, the pivoted bolster can be held and guided on the rails by four pairs of wheels. Each of these pairs of wheels comprises a wheel guided at the top and a wheel guided at the bottom of the rail.

In order to set the radial position of the plafform with the measuring elements it is adequate if the rotary position of one component of the traverse is set using an actuating drive. The actuating drive comprises e.g. a lever which acts on this component of the traverse and determines the angle position of the traverse. The forward-reverse drive of the lever can be effected using a spindle drive, hydraulically, electromagnetically or in some other manner. The angle position and the drive of only one component of the traverse, if possible in conjunction with a movement of the trolley or the pivoted bolster on the rail, makes it possible to precisely position the measuring element or elements in radial direction. To move the two pivoted bolsters with the traverse and the measuring device it is usually sufficient if one of the two pivoted bolsters is driven. The second pivoted bolster is pulled or pushed across the traverse by the first pivoted bolster, which is driven. In the embodiment according to the invention, too, electricity can be supplied for example by way of a current rail and a current collector or by way of a cable. Signal transmission can also take place by way of a current rail, wirelessly, or by way of a cable.

In the new device according to the invention, with the traverse comprising an articulation or joint, the traverse does not protrude outward beyond the track. Radial adjustment and positioning take place by rotary movements of the components of the traverse. It is not necessary to drive both pivoted bolsters individually. Driving one of the two pivoted bolsters is sufficient. The second pivoted bolster is moved, i.e. pushed or pulled, across the traverse on the track. Since the length of the traverse does not change, cabling in the traverse is significantly simplified. There is no need for so-called power supply chains because the ends of the traverse no longer slide longitudinally on the pivoted bolsters. The changes in angle that take place during operation result in bending which simple flexible cables will tolerate without any problems.

Below, the invention is explained in more detail with reference to the diagrammatic drawings which show embodiments of the invention and details thereof.

DESCRIPTION OF THE PREFERRED EMBODIMENTS

Figure 1:
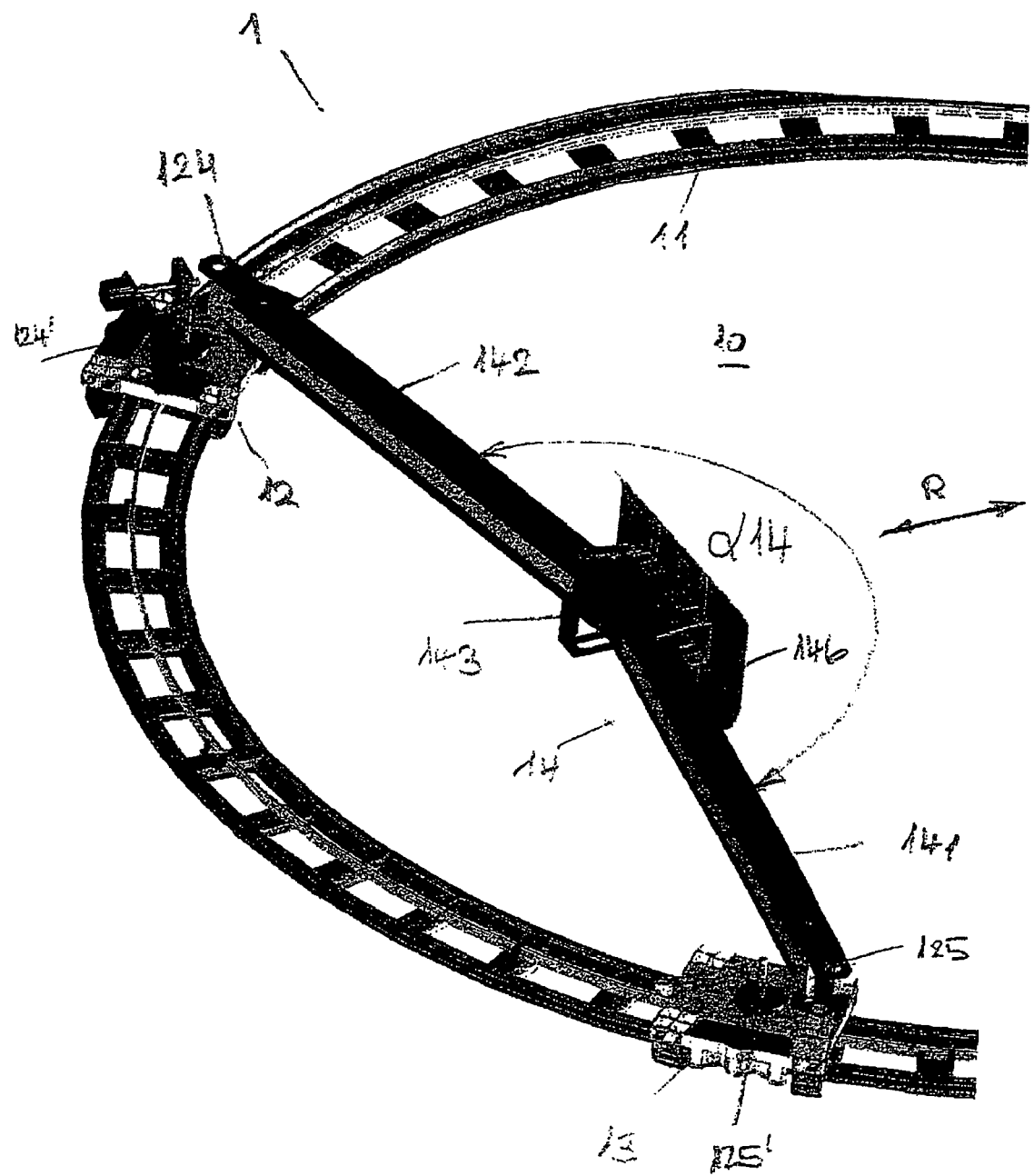
FIG. 1 is a perspective aspect of part of a device for positioning, comprising a circular track, wherein the traverse is in a position in which the components of the traverse form a concave angle in relation to each other.

The device, shown in FIG. 1, for positioning measuring instruments 1 comprises a traverse 14 with the two components 141 and 142. The traverse 14 is pivotably supported and held by the two pivoted bolsters 12 and 13 and is carried by the two pivoted bolsters 12 and 13. The track for the two pivoted bolsters 12 and 13 is circular. The two components 141 and 142 of the traverse 14, which components are e.g. of the same length, are interconnected by way of the pivot bearing or pivot joint 143. In the traverse 14 setting the angle α14, which in the embodiment shown is concave, takes place using a rotary drive (not shown) in the bearing 124 or in the bearing 125. The drive for setting the angle α14 could also be provided in the bearing. Setting the angle α14 can also take place with a linear drive which acts outside the pivot upon the traverse or upon the extension of the traverse beyond the pivot bearing.

FIG. 1 shows the traverse 14 supported by the bearings 124 and 125 on the pivoted bolsters 12 and 13, and held so as to be pivotable. Of course the traverse 14 can also be supported and pivotably held on the pivoted bolsters in the position of the diagrammatically shown pins 124' and 125'. In such an embodiment too, for example one of the pivot bearings can comprise a drive by means of which the angle α14 can be selectably set. However, the drive for setting the angle α14 could also be arranged in the bearing 143.

Figure 2:
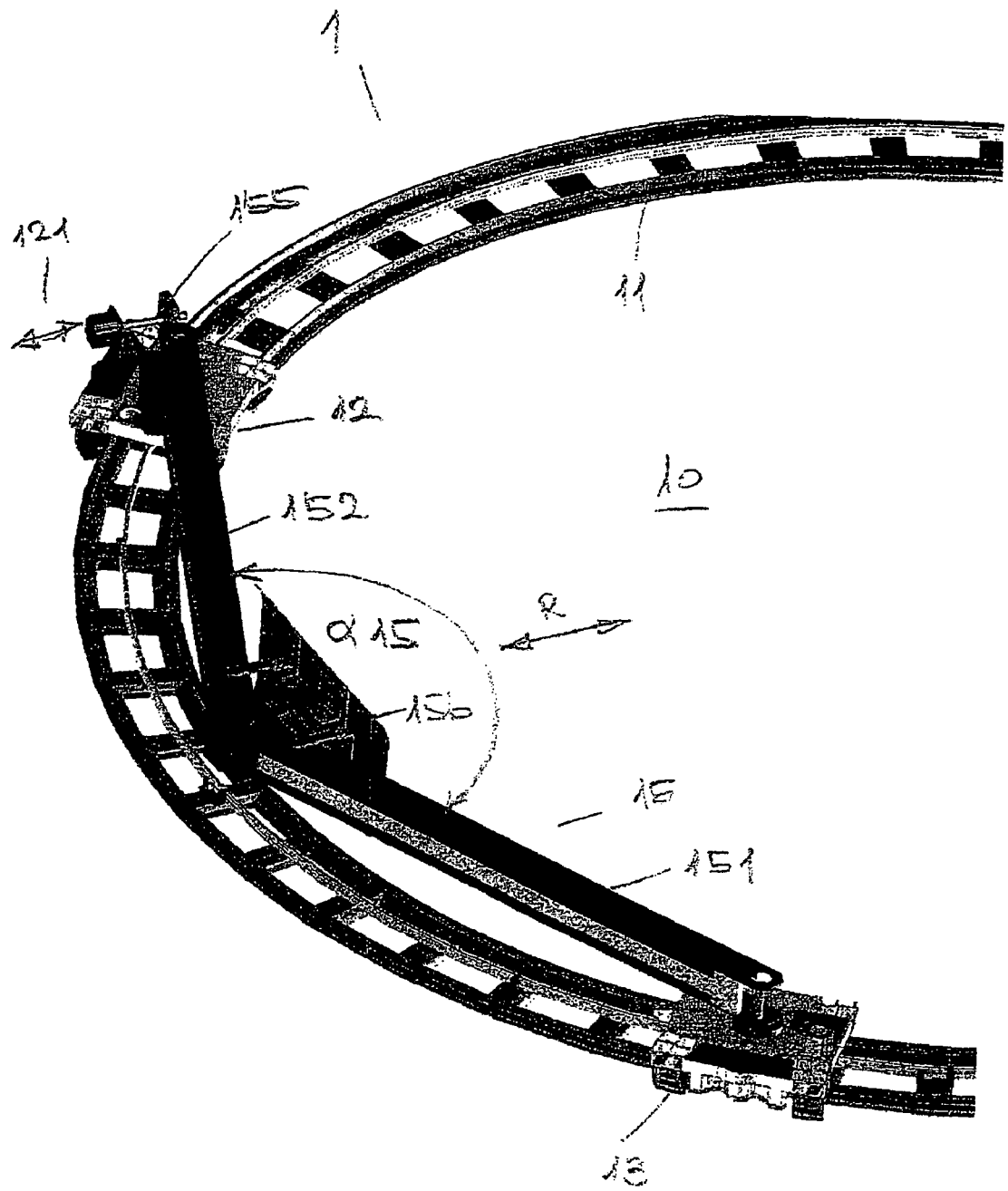
FIG. 2 is a perspective aspect of part of a device for positioning, comprising a circular track, wherein the traverse is in a position in which the components of the traverse form an obtuse angle in relation to each other.

The device shown in FIG. 2 for positioning measuring instruments 1 comprises the traverse 15 with the two components 151 and 152, which are pivotably supported and held on the two pivoted bolters 12 and 13. The traverse is carried by these two pivoted bolsters 12 and 13. Setting the angle α15, which in this embodiment is an obtuse angle, takes place with the linear drive that is diagrammatically indicated by a double-headed arrow 121, which linear drive is connected to the extension 155 of the component 152 of the traverse 15. Setting the angle α15, and thus also the radial position of the platform 156 comprising the measuring element (not shown), takes place by forward- and reverse movement of the linear drive 121. This linear drive can for example be a threaded spindle drive, a fluid-operated piston with a piston rod, or an electric linear motor.

The goods to be measured (not shown), e.g. a bubble made of a film of plastic material, of which film the thickness and the distance between a measuring element and the film bubble are to be measured and monitored, runs through the interior 10 of the circular track 11. Depending on the size of the diameter of the bubble, the position of the measuring element or measuring elements vis-á-vis the bubble has to be adjusted and set. This takes place in that the angles α14 and α15 of the two components of the traverse 14 and 15 are altered. The platform 146 or 156 is constructed such that its inward facing plate always remains aligned radially inward irrespective of the angle α14 or α15. However, the platform could also be constructed such that the alignment of the plate can be set.

In the examples shown it is sufficient if only one of the two pivoted bolsters 12 or 13 is driven for moving on the rail track 11. The second pivoted bolster is pulled or pushed by the first pivoted bolster, together with the traverse. The mutual position of the two pivoted bolsters is determined and altered with the angular position of the two components of the traverse.

The track can be carried by supports (not shown) or it can for example be suspended from a ceiling or from a latticework structure. In FIGS. 1 and 2 the pivoted bolsters 12, 13 are shown resting on the rails of the rail track 11. However, the pivoted bolsters 12, 13 could also be designed so as to be below the rail track 11, suspended from the rails.

The examples shown in the figures show two-component traverses 14, 15. However, the traverses could also comprise three or more components that are interconnected in an articulated manner. The radial position of the platform 146 or 156 is altered and set by altering the angle α14 or α15, as shown by the double-headed arrow R.

In another embodiment of the invention, a bending bearing, for example made from spring steel, can take the place of the pivot joint that interconnects the components of the multipart traverse in an articulated manner. In a further embodiment for positioning measuring instruments, according to the invention, instead of the swan-neck traverse with the joint between the components of the traverse, a telescopic traverse could be used, wherein each end of the telescopic traverse is supported by one of the pivoted bolsters, and wherein the telescopic traverse is pivotably held. In this way the traverse constitutes a chord of the rail track 11. By retracting or extending the telescopic traverse, the traverse constitutes chords which extend radially further outward or radially further inward through the interior. In this way the radial position of a platform on the telescopic traverse can be altered and adjusted. The components of the telescopic traverse can have any desired cross-sectional shape; i.e. they can for example be circular, elliptical, polygonal, etc.

The middle component of the telescopic traverse carries the measuring element. If for example a film bubble is monitored and measured, the design of the telescopic traverse must ensure that the middle component always remains positioned exactly between the two pivoted bolsters and that the measuring element remains precisely aligned with the middle of the film bubble to be measured.

The device 1 for positioning the measuring element of a measuring apparatus comprises a traverse 14 on which the measuring element is arranged. The device further comprises a track 11 on which bearings 12, 13 run, and on which the traverse 14 is held by means of bearings 124, 125. The measuring element of the measuring apparatus can be positioned radially in relation to the track 11 and along the track 11. The traverse 14 comprises multiple components, wherein the components 141, 142 of the traverse 14 are interconnected with one or several bearings 143, or the components 141, 142 of the traverse 14 are held inside each other so as to be telescopically slidable. Radial positioning takes place in that the angle α14 between the components 141, 142 of the traverse 14 is changed or in that in the case of a telescopic traverse 14, which constitutes a chord in the track 11, the length is altered.

The invention claim is:

1. A device for positioning a measuring element of a measuring apparatus, comprising an arcuate track, track bearings that are movable on the track, and a traverse held on the track bearings on which the measuring element is arranged, the traverse comprising a plurality of components for positioning, the measuring element of the measuring apparatus being positioned radially in relation to the track and along the track,
    the components of the traverse being moveably interconnected with each other by at least one of a component bearing so as to allow angular adjustment of each component along the track and by being held inside each other so as to be telescopically slidable.

2. The device according to claim 1, wherein the component bearing comprises one of a pivot bearing and a bending bearing.

3. The device according to claim 2, wherein the at least one of the pivot bearing and the bending bearing permits angular positions in the region of acute and/or obtuse angles and/or angles of 180° and/or concave angles α14.

4. The device according to claim 1, wherein the track bearings that are movable on the track between the track and the traverse are pivoted bolsters which can be moved on the track towards each other, away from each others; in unison with each other, and at identical speed or at different speeds.

5. The device according to claim 4, wherein the traverse includes pivot bearings in a region of its ends, wherein the track bearings comprise pivoted bolsters that are movable on the track, and wherein the pivot bearings are connected to the pivoted bolsters.

6. The device according to claim 1, wherein the traverse includes in a region of its ends pivot bearings that are connected to the track bearings movable on the track.

7. The device according to claim 1, wherein the traverse comprises one of a sole pivot bearing and a bending bearing between the track bearings that are movable on the track further including a servomotor and lever drive for setting an angle (α14) between the components of the traverse wherein the components are connected to the one of the pivot bearing and the bending bearing.

8. The device according to claim 1, wherein at least one of the track bearings comprises a drive motor for moving the track bearings with the traverse and with the measuring element along the track.

9. The device according claim 1, comprising a carrier arm on which the measuring element of the measuring unit is arranged, wherein said carrier arm is installed on the traverse, and wherein said carrier arm with the measuring element arranged thereon can be slid or telescopically extended or retracted in a specifiable direction.

10. The device according to claim 9, wherein the specifiable direction in which the measuring element is extendable or retractable is a radial direction in relation to the track.

11. The device according to claim 1, including a measuring unit for measuring the thickness of plastic, film comprising a measuring element which operates capacitively, optically, thermally, acoustically or with the use of radioactive radiation.

12. The device according to claim 11, wherein the radioactive radiation comprises one of β-radiation and γ-radiation.

13. The device according to claim 1, wherein the track is a circular track.

14. A device for positioning a measuring element comprising a circularly curved track, a device extending across the track and intersecting the track at first and second, spaced-apart intersection points, the traverse having first and second components and a component bearing connecting the components so that the components are movable relative to each other; and first and second track bearings located at the intersection points, movable along the track, and mounting the first and second components so that they are movable along the track while maintaining the measuring element in a desired orientation.

15. The device according to claim 14, wherein the component bearing comprises one of a pivot bearing and a bending bearing.

16. The device according to claim 14, wherein the component bearing comprises a plurality of members held inside each other for sliding telescopic movement.

* * * * *